United States Patent Office 3,302,907
Patented Feb. 7, 1967

3,302,907
AIRCRAFT
Geoffrey Light Wilde, Derby, and John Frederick Coplin, Littleover, Derby, England, assignors to Rolls-Royce Limited, Derby, England, a company of Great Britain
Filed Nov. 30, 1964, Ser. No. 414,536
Claims priority, application Great Britain, Jan. 9, 1964, 1,119/64
10 Claims. (Cl. 244—55)

This invention relates to aircraft adapted to take-off and land vertically.

According to the present invention an aircraft having at least one forward propulsion engine is provided with an additional propulsion unit which is mounted so as to be movable between a position in which it is disposed within the fuselage of the aircraft and a further position in which it is disposed externally of the aircraft so as to be capable of producing lift forces on the aircraft independently of those produced by the aerodynamic surfaces of the aircraft during forward flight thereof or forward propulsion.

Preferably two additional propulsion units, or multiples of said two additional propulsion units, are provided, the said units being positioned on said aircraft whereby the resultant thrust vector of said units pass through the centre of gravity of the aircraft.

Each propulsion unit is preferably adapted so that its propulsive thrust can be directed rearwardly of the aircraft to enable transition of the aircraft from vertical to forward flight to be effected.

Each propulsion unit is also preferably adapted so that its propulsive thrust can be directed forwardly of the aircraft to provide a braking effect to reduce the forward speed of the aircraft, and to assist in effecting transition from forward to vertical flight.

Where only one additional propulsion unit is employed, it preferably comprises a jet propulsion gas turbine engine which, when it is disposed externally of the aircraft, is positioned beneath the aircraft, with its longitudinal axis parallel to the longitudinal axis of the aircraft.

The propulsion nozzle of the said gas turbine is adapted so as to be capable of directing the exhaust gases of the engine downwardly, forwardly or rearwardly relative to the aircraft.

Alternatively the said gas turbine engine may have a rearwardly directed nozzle and two further propulsion nozzles in addition to the said fixed propulsion nozzle which are arranged upstream thereof, means being provided for preventing the exhaust gases flowing through said fixed nozzle and directing them to the two further propulsion nozzles, which are adapted so as to be capable of directing the exhaust gases downwardly, forwardly or rearwardly relative to the aircraft.

Where two additional propulsion units, or multiples of said two additional propulsion units, are employed each unit preferably comprises a jet propulsion gas turbine engine carried on an arm pivotally mounted on the aircraft fuselage.

Each engine may be pivotally mounted on the arm so as to be rotatable at right angles to its longitudinal axis, so that the thrust produced by the engine can be directed either forwardly, downwardly or rearwardly.

According to a further feature of the invention where two additional propulsion units, or multiples of said two additional units, are employed each unit may comprise a fan.

Each fan is preferably driven by a turbine comprising a plurality of turbine blades disposed around the outer periphery of the fan blades, the motive fluid for the turbine being supplied at least in part by the exhaust gases of the forward propulsion engine.

Alternatively the turbine blades may be disposed at the inner periphery of the fan blades.

Means are preferably provided for directing the whole of the gases from the forward propulsion engine to the turbines and further gas producing means may also be provided to supply additional motive fluid for the turbines simultaneously with that of the forward propulsion engine.

Where additional gas producing means are employed the total pressure of the gas therefrom must be substantially identical to the total pressure of the gas from the forward propulsion engine.

Each fan is preferably carried on an arm pivotally mounted on the aircraft fuselage, the arm comprising a conduit through which the motive fluid for the turbine is conveyed to a plenum chamber.

Each fan may be mounted so that its axis of rotation can be progressively moved from a vertical position to a horizontal position whereby thrust produced by the fans may be directed rearwardly to provide forward thrust to enable transition from vertical flight to forward flight to be effected.

Each fan is also mounted so as to be capable of directing the thrust produced thereby forwardly relative to the aircraft.

Alternatively each fan may be provided with deflector means whereby the thrust produced by the fan may be deflected rearwardly, downwardly or forwardly relative to the aircraft.

Preferably the forward propulsion comprises a jet propulsion gas turbine engine of the by-pass type.

The invention is illustrated merely by way of example, in the accompanying drawings, in which.

Figure 1:
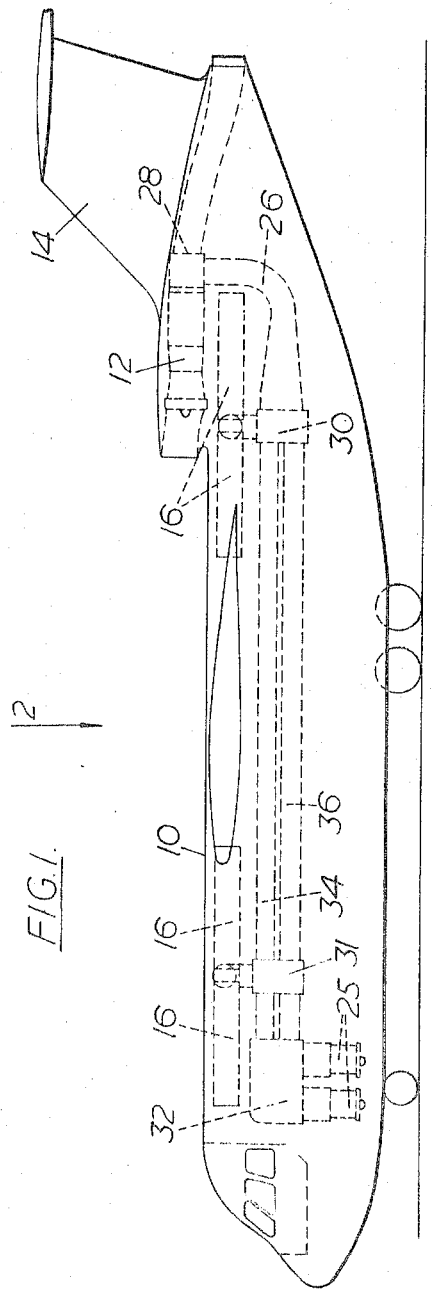
FIGURE 1 is a side elevation of an aircraft in accordance with the invention.
Figure 2:
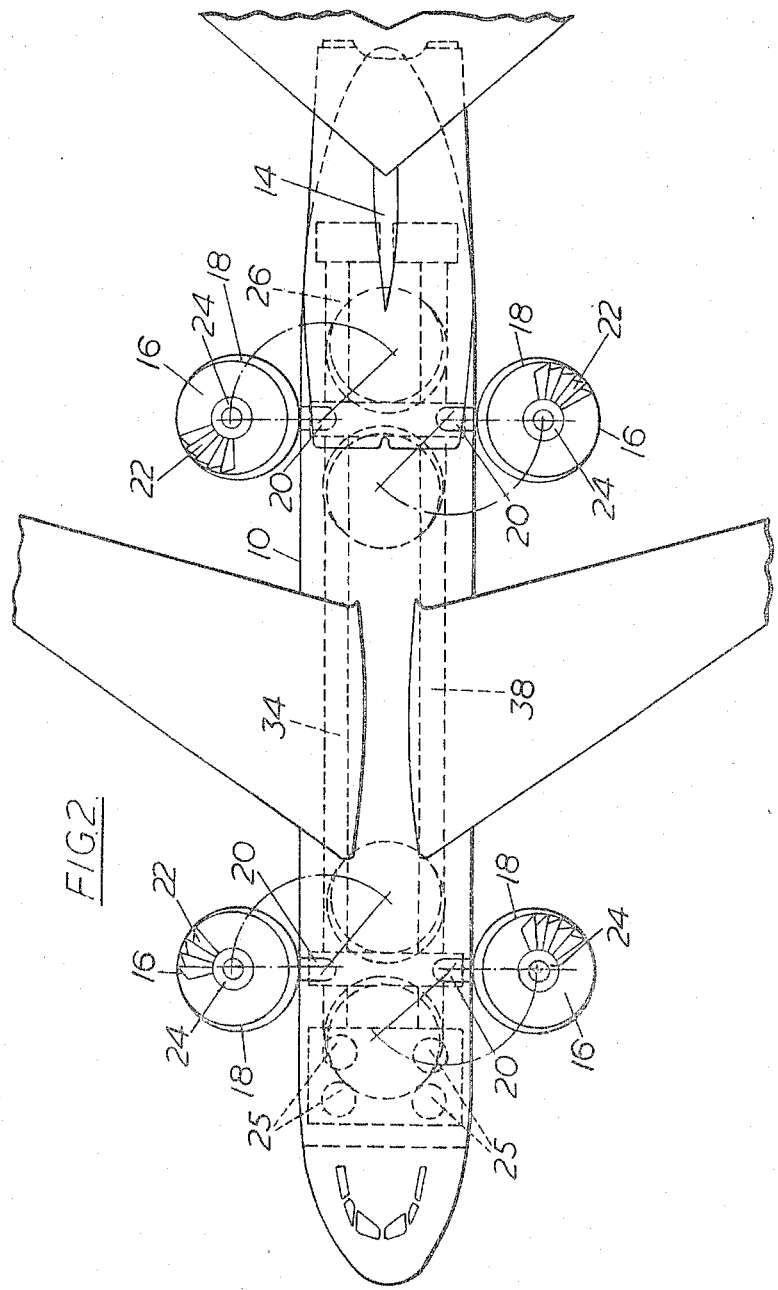
FIGURE 2 is a plan view of the aircraft shown in FIGURE 1.

Referring to FIGURES 1 and 2 of the drawings, an aircraft 10 has two forward propulsion gas turbine engines 12 which are preferably of the by-pass type mounted at the root of the tail-plane 14, to provide forward thrust.

To enable the aircraft 10 to take off and land vertically four additional propulsion units in the form of fans 16 are provided, each fan 16 being carried in a housing 18 mounted on one end of an arm 20, the other end of which is pivotally connected to the aircraft fuselage.

Each fan comprises fan blades 22 mounted upon a hub 24, and attached to the tip of each fan blade 22 is a turbine blade, not shown. The turbine blades form part of an impulse turbine which drives each fan. It will be appreciated that the turbine may be a reactor turbine.

The fans 16 are arranged in two groups of two, one group being disposed forwardly of the centre of gravity of the aircraft, adjacent the nose thereof, and the other group being disposed rearwardly of the centre of gravity, the fans in each group having their axes of rotation disposed on a common plane which extends transversely of the longitudinal axis of the aircraft.

As is apparent from FIGURE 2 of the drawings the fans 16 can be pivoted, by means not shown, from a position in which they are disposed within the fuselage with their axis of rotation arranged vertically to a position outside the fuselage in which position, with their axes of rotation disposed vertically and with the fans rotating the fan effluxes will produce vertical lift force on the aircraft independently of those produced by the aerodynamic surfaces of the aircraft during forward flight.

Each fan 16 is also mounted on its arm 20 in such a manner that it can be moved whereby its axis of rotation can be disposed horizontally instead of vertically to provide thrust rearwardly of the aircraft instead of vertically.

Alternatively each fan 16 may be provided with deflector means not shown which can deflect the fan efflux rearwardly of the aircraft to provide forward propulsion.

The fluid for driving the impulse turbine of each fan consists of exhaust gases from the forward propulsion engines 12 and four additional gas turbine engines 25 mounted at the front of the aircraft, the additional engines having their longitudinal axes disposed vertically.

A conduit 26 communicates at one end with the jet pipe 28 of each forward propulsion engine 12 whilst its other end communicates with a manifold 30 into which the exhaust gases of the forward propulsion engines can be directed by a deflector valve in the jet pipe 28 of each forward propulsion engine downstream of the point where the conduit 26 communicates with the jet pipe.

The exhaust gases from the additional gas turbine engines 25 are also fed into a common manifold 32, which communicates with the manifold 30 by means of a manifold 31 and four conduits 34, 36, 38 and 40, the conduits 34, 36 extending down one side of the aircraft and the conduits 38 and 40 extending down the other side of the aircraft.

It will be appreciated, of course, that the total pressures of the exhaust gases of the forward propulsion engines 12 and the additional engines 25 must be the same.

The propulsion engines 12 will be designed to give the best cruise fuel consumption and will preferably be by-pass engines. The additional engines 25, which are used only at take-off, can be designed specially for this purpose and may be low pressure ratio pure jet engines with a high turbine entry temperature, the thermodynamic cycle of which will be chosen to give an exhaust total pressure substantially identical to that of the mixed exhausts of the by-pass propulsion engines.

When the above described aircraft is to take-off vertically the fans 16 are moved to the full line position shown in FIGURE 2 of the drawings. The deflector valves in the jet pipes 28 of the forward propulsion engines are then moved to a position in which they will deflect the exhaust gases of the forward propulsion engines into the conduits 26, and then the engines 12 and 25 are started.

The exhaust gases from the engines thus enter the manifolds 30, 31 and 32 and then the conduits 34, 36, 38 and 40, and are directed to the impulse turbines through the arm 20 of each fan, thus rotating the fans and producing a vertical thrust which causes the aircraft to take-off vertically.

When the aircraft has attained sufficient height the fans 16 are then moved so that their efflux is progressively directed rearwardly to provide forward thrust on the aircraft.

When the aircraft has attained sufficient forward speed and lift forces are generated on the aerodynamic surfaces of the aircraft the deflector valves in the jet pipes 28 are then moved so as to permit the exhaust gases of the forward propulsion engine to pass through the propulsion nozzles of the forward propulsion engines and simultaneously the engines 25 are shut down.

The fans are then returned to the full line position shown in FIGURE 2 of the drawings and then moved into the interior of the aircraft fuselage. Doors, not shown, are then moved to close off the slots in the fuselage which provide access to the interior of the fuselage.

Figure 3:
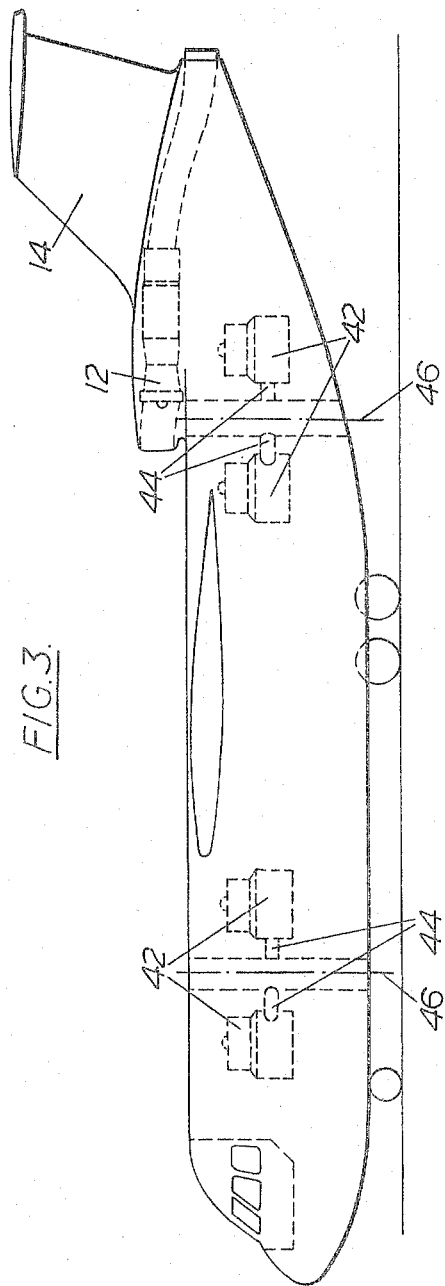
FIGURE 3 is a side elevation of a further aircraft according to the present invention.
Figure 4:
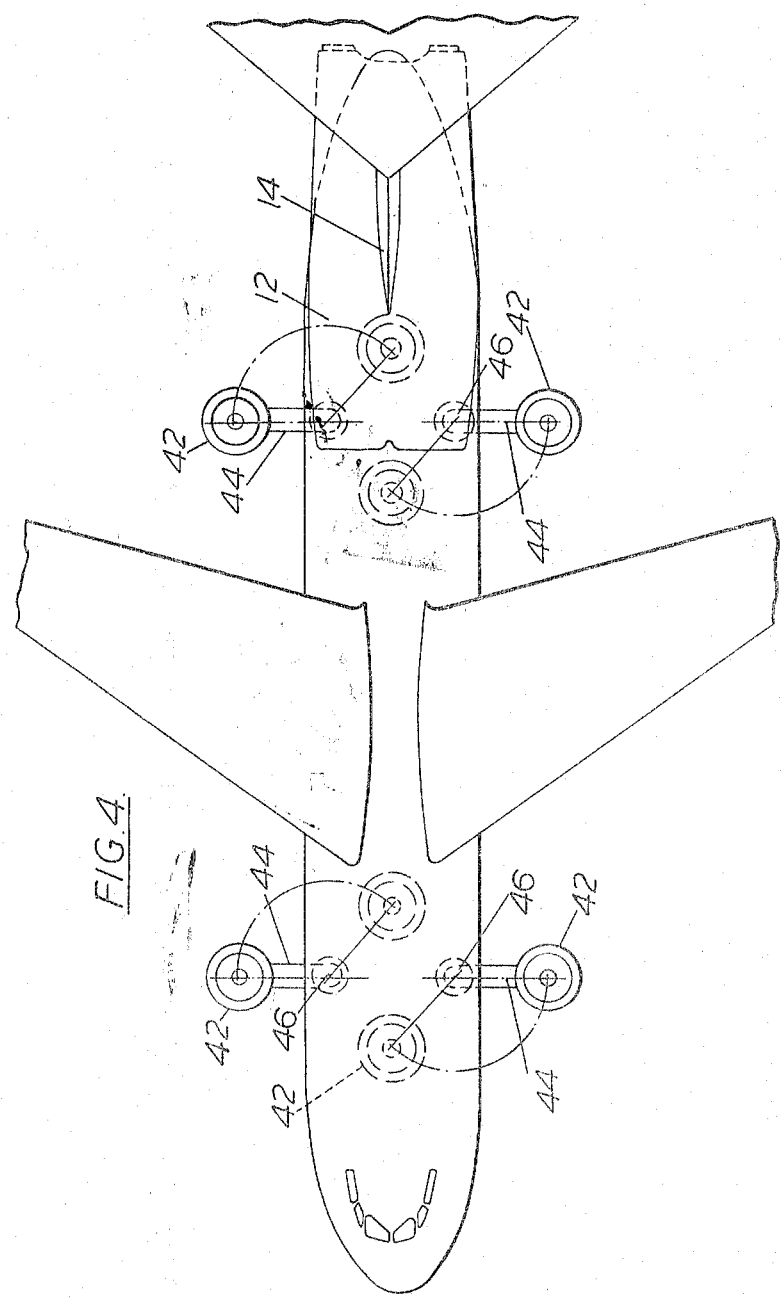
FIGURE 4 is a plan view of the aircraft of FIGURE 3.

In the construction shown in FIGURES 3 and 4 of the drawings, 10 again indicates an aircraft having two forward propulsion engines 12, preferably of the by-pass type, mounted at the root of the tail-plane 14 to provide forward thrust.

As in the arrangement described with reference to FIGURES 1 and 2 of the drawings four additional propulsion units are provided to enable the aircraft to take-off and land vertically. However instead of the additional units being fans each unit comprises a jet propulsion gas turbine engine 42, such as that described in our co-pending U.S. patent application No. 378,838, now abandoned.

Each engine is mounted on an arm 44 pivotally connected to the aircraft fuselage, the arm being in the form of a conduit through which fuel, and oil supply and return pipes for the engine 42 may extend.

Since in this particular construction engines 42 are employed instead of fans, it is unnecessary for the forward propulsion engines 12 to provide a motive fluid therefor.

Thus the manifolds 30, 31, 32 and conduits 34, 36, 38 and 40 together with the deflector valve can be omitted, as also can the four addtional gas turbine engines 25 of the previous example.

Each engine 42 is supported on its arm 44 so that it can be pivoted about the axis 46 whereby the thrust produced by the engine can be directed rearwardly to enable transition of the aircraft from vertical to forward flight and vice versa to be effected. Similarly the engines can be pivoted so that their thrust is directed forwardly to provide a braking effect during forward flight of the aircraft.

In each of the above described examples four additional propulsion units are employed, but alternatively only one such additional propulsion unit need be used. For example a jet propulsion gas turbine engine is supported from the aircraft fuselage in such manner that it can be moved from a position within the fuselage to a position externally of and below the fuselage with its longitudinal axis perpendicular, or substantially perpendicular to the longitudinal axis of the aircraft fuselage.

The final nozzle of the engine is adapted so that the exhaust gases issuing therefrom may be directed rearwardly or forwardly of the aircraft, or downwardly to provide vertical thrust. The final nozzle may be of the kind described in British patent specification No. 743,874.

Alternatively the final nozzle may be adapted to direct the exhaust gases rearwardly of the aircraft, two additional nozzles being provided in the engine jet pipe upstream of the final nozzle, valve means being provided in the jet pipe to prevent exhaust gas passing through the final nozzle and to direct it through the two additional nozzles which are rotatable so as to direct the gases forwardly, downwardly or rearwardly relative to the aircraft.

We claim:
1. An aircraft having a fuselage, aerodynamic surfaces, at least one forward propulsion engine, and an additional propulsion unit which is mounted so as to be movable between a retracted position in which it is disposed within the fuselage of the aircraft, and an extended position in which it is disposed externally of the aircraft so as to be capable of producing lift forces on the aircraft independently of those produced by the aerodynamic surfaces of the aircraft during forward flight thereof, and means operable to pivot the additional propulsion unit selectively rearwardly and forwardly about a pivot axis perpendicular to the longitudinal axis of the aircraft for directing the thrust of the additional propulsion unit respectively rearwardly of the aircraft to enable transition of the aircraft from vertical to forward flight to be effected and forwardly of the aircraft to provide a braking effect and reduce the forward speed of the aircraft.

2. An aircraft as claimed in claim 1 having at least one pair of said additional propulsion units and at least one pair of arms pivotally mounted on the fuselage, each additional unit being mounted on one of said arms, and means for swinging each said arm about an axis perpendicular to the longitudinal axis of the aircraft and to said pivot axis to move each additional propulsion unit between said retracted and extended positions.

3. An aircraft as claimed in claim 2 in which each unit is pivotally mounted on the respective arm so as to be rotatable when in its extended position on said arm about said pivot axis.

4. An aircraft as claimed in claim 2 in which each additional propulsion unit comprises a fan having a plurality of turbine blades disposed around the periphery thereof and constituting driving means for the fan.

5. An aircraft as claimed in claim 4 in which the motive fluid for the turbine blades is supplied at least in part by the exhaust gases of the forward propulsion engine.

6. An aircraft as claimed in claim 5 in which additional gas producing means are provided to supply additional motive fluid to the turbines.

7. An aircraft as claimed in claim 6 in which total pressure of the gases from the forward propulsion engine and the additional gas producing means are substantially identical.

8. An aircraft as claimed in claim 4 comprising respective conduits provided in each respective arm and through which the motive fluid for the turbine blades of the respective fan is conveyed.

9. An aircraft as claimed in claim 1 in which each additional propulsion unit comprises a jet propulsion gas turbine engine.

10. An aircraft as claimed in claim 1 in which the at least one forward propulsion engine comprises a by-pass gas turbine engine.

References Cited by the Examiner

UNITED STATES PATENTS

| | | | |
|---|---|---|---|
| 2,497,590 | 2/1950 | Drill | 244—56 X |
| 2,926,868 | 3/1960 | Taylor | 244—56 X |
| 3,066,889 | 12/1962 | Kelly | 244—12 |
| 3,084,888 | 8/1963 | Hertel | 244—23 |
| 3,134,561 | 5/1964 | Clejan | 244—54 X |

MILTON BUCHLER, *Primary Examiner.*

B. BELKIN, L. C. HALL, *Assistant Examiners.*